United States Patent
Kyriacou

[15] 3,668,209
[45] June 6, 1972

[54] SEPARATION OF CHLORINATED PYRIDINES AND DERIVATIVES THEREOF

[72] Inventor: Demetrios Kyriacou, Oakley, Calif.

[73] Assignee: The Dow Chemical Company, Midland, Mich.

[22] Filed: Apr. 8, 1971

[21] Appl. No.: 132,550

Related U.S. Application Data

[63] Continuation-in-part of Ser. No. 784,226, Dec. 16, 1968, abandoned.

[52] U.S. Cl. .................................260/290 A, 260/294.9
[51] Int. Cl. ............................................C07d 31/16
[58] Field of Search ........................260/290, 294.9

[56] References Cited

UNITED STATES PATENTS 3,317,542   5/1967   Hazeldine et al. ...................260/290

Primary Examiner—Henry R. Jiles
Assistant Examiner—Harry I. Moatz
Attorney—Griswold & Burdick, S. Preston Jones and C. Kenneth Bjork

[57] ABSTRACT

The present disclosure is directed to a method for separating halogen substituted pyridines having an unhindered hydrogen atom in a position alpha or beta to the ring nitrogen from closely related halogen substituted pyridines which lack such a hydrogen atom. The separation is carried out by contacting a mixture of the above pyridines with sulfuric acid or an alkane sulfonic acid in the presence of a solvent for those species not possessing an unhindered hydrogen atom followed by a hydrolysis step. This method can also be employed to separate isometric polychloropyridines from each other.

10 Claims, No Drawings

SEPARATION OF CHLORINATED PYRIDINES AND DERIVATIVES THEREOF

CROSS-REFERENCE TO RELATED APPLICATION

This application is a continuation-in-part of my co-pending application Ser. No. 784,226, filed Dec. 16, 1968, now abandoned.

BACKGROUND OF THE INVENTION

This invention relates to the separation of closely related halogen substituted pyridines from each other in a mixture containing these pyridines and is particularly concerned with the separation and recovery of halogenated pyridines having an unhindered hydrogen atom in a position alpha or beta to the ring nitrogen from admixture with other such substituted pyridines not possessing such a hydrogen atom.

Mixtures of halogen substituted pyridines, hereinafter called halopyridines, ordinarily result from liquid or vapor phase operations conventionally employed for the halogenation of pyridine or substituted pyridines, for example, picoline. To date, such mixtures have been separated only with difficulty using inefficient processes. To illustrate, in U.S. Pat. No. 2,679,453 a methyl pyridine is chlorinated with gaseous chlorine in the presence of water at a temperature of from 50°–150° C. resulting in the production of a mixture of halogen substituted derivatives. This patent further teaches the recovery of the separate products by fractional distillation under reduced pressure.

Other methods taught in U.S. Pat. Nos. 3,251,848 and 3,256,167 also suggest separation of the various halogenated pyridines by fractional distillation.

The use of fractional distillation to separate mixtures of halogenated pyridines into their components has a number of disadvantages. One such disadvantage is the large number of plates required in the distillation column for efficient separation which requires a high monetary outlay in equipment.

The present invention avoids these difficulties and makes for a clean separation of halogenated pyridine components present in mixtures along with high levels of product recovery. The instant process also provides an economical method for separating polyhalogenated pyridines from each other which can be practiced using conventional in-plant equipment.

SUMMARY OF THE INVENTION

The present invention relates to a method for separating halogen substituted pyridines having an unhindered hydrogen atom in a position alpha or beta to the ring nitrogen from closely related hydrogen substituted pyridines which lack such a hydrogen atom.

This invention also contemplates separations of various halopyridines such as those wherein all of the halogen substituents can be the same, or wherein the compounds have mixed halogen moieties, i.e., those compounds having chlorine, bromine, fluorine or iodine or mixed halogen substituents. Also contemplated are separations wherein groups other than halogen can be attached directly to the pyridine ring such as cyano, nitro, or loweralkyl groups of one to four carbon atoms.

One specific advantage of this invention is that it permits separations between halopyridine isomers which heretofore have been very difficult, or almost impossible, to achieve; and separations between polyhalopyridines and monohalopyridines and/or unhalogenated pyridines by a simple, rapid and inexpensive method.

In general, the method of the present invention comprises intimately contacting in any convenient fashion a polyhalopyridine containing mixture having pyridine species both with and without unhindered hydrogen atoms alpha or beta to the ring nitrogen, with sulfuric acid, an alkane monosulfonic acid or alkane disulfonic acid, preferably, an inert liquid carrier, which is a solvent for those polyhalogenated pyridine species in the mixture which do not possess an unhindered alpha or beta hydrogen atom is also employed.

The terms "alkane sulfonic acid" and "alkane disulfonic acid" as employed in the present specification and claims designate sulfonic acids having a straight or branched chain alkane group containing from one to about five carbon atoms. Representative sulfonic acids include, for example, methanesulfonic acid, methanedisulfonic acid, ethanedisulfonic acid, 2-propanesulfonic acid, butanesulfonic acid, 2-methypropane-1-sulfonic acid, 3-methylbutanesulfonci acid, ethanedisulfonic acid, 3-pentanesulfonic acid and pentanedisulfonic acid, among others.

Ordinarily, in the practice of this invention, a product stream from a liquid or vapor phase pyridine halogenation process containing a mixture of halogenated pyridines is neutralized and intimately contacted with concentrated sulfuric acid or an alkane (mono- or di-) sulfonic acid, either before or after the product stream is mixed with a carrier liquid which is immiscible with the acid and which is a solvent for those polyhalogenated pyridine species which lack an unhindered alpha or beta hydrogen atom, and which is of a specific gravity such as to allow ready separation from the acid. It is preferable, from the standpoint of ease of operation and convenience, that the liquid carrier be mixed with the halogenated pyridines prior to contact with the acid.

After a thorough mixing of the acid with the halogenated pyridines, the mixture is allowed to separate into two phases, a lower acid phase which contains the acid reaction product of the unhindered hydrogen atom containing pyridines and an upper liquid carrier solvent phase containing the halopyridines lacking such a hydrogen solvent atom. The solvent phase is separated by decantation or other conventional separatory procedure, washed with dilute aqueous base to insure acid removal and stripped of solvent to recover the pyridines contained therein. Any tendency towards emulsification during the water washing step can be overcome by addition to the wash water of 1 gram of sodium chloride per 100 milliliters of water. The acid phase is diluted with sufficient water to decompose the acid pyridine reaction products. The halopyridines are insoluble in the diluted acid and can be easily recovered by dissolution in a solvent therefor, such as one of the solvents mentioned hereinbefore, followed by solvent stripping or by some other conventional method to remove the solvent leaving the halopyridine as a residue.

It is feasible at the initial stage of operation to carry out the contacting of the polyhalopyridine containing mixture with the acid in the absence of a solvent to convert at least a portion of those pyridines not having an unhindered hydrogen atom and which have not undergone reaction with the acid. However, from a practical standpoint, this is not very workable even on those materials which are solid. These separations are slow and/or incomplete and particularly difficult with those materials which are liquid. Additionally, premixing a liquid carrier with the halopyridine mixture before the acid addition offers the advantage of serving to control the rate of heat evolution during acid addition. Also, local overheating is prevented or greatly minimized and more intimate contact between the various components of the system occurs.

If sulfuric acid is employed, this reactant should have a concentration of at least 70 percent $H_2SO_4$, and preferably, it should be of from about 80 to about 98 percent $H_2SO_4$.

The amount of either sulfuric acid or alkane (mono- or di-) sulfonic acid employed can vary and is usually present in sufficient quantity to provide a molar ratio of at least 1 mole of acid per mole of halogenated pyridine. It is preferable for ease of operation and from a standpoint of economy to have the acid present in the ratio of from 2 to 7 moles of acid per mole of halogenated pyridine since the higher yields are obtained with larger amounts of acid.

The process can be carried out over a wide temperature range ranging from 0° C. up to the boiling point of the solvent or the temperature at which the acid attacks the halogenated pyridines or solvent, whichever is the lower. The preferred temperature range is between about 25° and 65° C. The contact time is not critical as long as it is sufficient to complete the reaction. A minimum contact time between the acid and the halogenated pyridines of at least about 0.001 second appears to be sufficient for the reaction to proceed. However, in order to insure intimate and thorough contact between the acid and the halopyridines, it is preferred that a contact time of between about 1 and about 30 minutes be employed. Longer contact times of up to 2 or 3 days do not adversely affect the results provided the temperature is maintained low enough to prevent decomposition of the halogenated pyridines or solvent by the acid.

The inert liquid carrier can be any material which is (1) liquid at the reaction conditions, (2) nonreactive and immiscible with the acid and (3) which is preferentially a solvent for those halopyridines not possessing an unhindered hydrogen atom in a position alpha or beta to the ring nitrogen.

Representative inert liquid carriers include dichloromethane, hexane, pentane, heptane, octane, isopentane and carbon tetrachloride. The specific liquid carrier to be employed in a given operation will depend on the results desired from a predetermined mixture and readily can be determined by one skilled in the art. For most operations, the preferred liquid carriers are dichloromethane and hexane. The liquid carrier is usually employed in an amount of between about 2 and 10 volumes of carrier per volume of acid.

DESCRIPTION OF SOME PREFERRED EMBODIMENTS

The following examples illustrate the best methods now known for the practice of the present invention and will enable those skilled in the art to practice the invention.

EXAMPLE 1

A qualitative indication of whether or not a mixture of polyhalopyridines contains species separable by the practice of the present invention can be obtained without a detailed knowledge of the structures of the several species present by making the following test.

TEST PROCEDURE

Equal volumes of a polyhalopyridine and concentrated sulfuric acid are mixed by slowly pouring the acid into the mixture with stirring and observing the temperature rise if any. A temperature rise of 5° C. or less indicates that no appreciable proportion of salt forming species are present.

In a representative operation, a number of polyhalopyridine compounds with and without an unhindered hydrogen atom in a position alpha or beta to the ring nitrogen are separately screened to determine their ability to form salts with sulfuric acid. To separate 50 milliliter round bottom flasks is added a 3 gram portion of one of the test compounds. The flask is fitted with a thermometer and agitates while each test compound is mixed with 4 grams of concentrated sulfuric acid (about 96 percent $H_2SO_4$). The resultant temperature rise is recorded. To each mixture is added 25 milliliters of dichloromethane with agitation and each allowed to stand whereupon the mixture phase separates into an acid layer and a dichloromethane layer. In each, the dichloromethane layer is separated by decantation, the dichloromethane removed by stripping and the residue remaining weighed. The acid layer is diluted with 10 milliliters of water and any precipitate formed is taken up with dichloromethane. The dichloromethane is removed by stripping and the residue weighed. The results of this screening is given in the following table:

| Compound Tested | Temp. Rise °C. | Weight % Pyridine Recovered From DCM Layer* | Acid Layer |
|---|---|---|---|
| | | grams | |
| 2,6-dibromopyridine | 40 | 0 | 3 |
| 2,4-difluoro- 3,5-dichloro-pyridine | 40 | 0 | 3 |
| 2,3,6-trichloropyridine | 20 | 1.5 | 1.5 |
| 2,4-difluoro- 3,6-dichloro-pyridine | 20 | 1.5 | 1.5 |
| 2,6-difluoro- 3,5-dichloro-pyridine | 5 | 3 | 0 |
| 2,6-dichloropyridine | 30 | 0 | 3 |
| 2,3,5,6-tetrachloropyrazine | 5 | 3 | 0 |
| 2-trichloromethyl-6-chloro-pyridine | 20 | 0 | 3 |
| 2-cyano-6chloropyridine | 20 | 1 | 2 |
| tetrachlorocyanopyridine:** | 0 | 3 | 0 |
| 2,3,4,5-tetrachloropyridine | 60–65 | 0 | 3 |
| 2,3,5,6-tetrachloropyridine | 0 | 3 | 0 |
| 2,3,4,5-tetrachloropyridine and 2,3,5,6-tetrachloropyridine mixture (3 grams each) and equal volume sulfuric acid | 20–25 | 3 | 3 |

*Dichloromethane
**Mixture of 2,4,5,6- and 3,4,5,6-tetrachloro- cyanopyridine isomers

EXAMPLE 2

To an agitated mixture containing 100 grams of a mixture of 2,3,4,5-tetrachloropyridine (88 weight percent), 2,3,5,6-tetrachloropyridine (8 weight percent) and pentachloropyridine (4 weight percent) dissolved in 150 milliliters of dichloromethane is added 60 milliliters of about 96 percent sulfuric acid. A temperature increase of 40° C. is observed with the formation of two phases. Agitation is continued for a few additional minutes after which the phases are allowed to separate. The upper dichloromethane layer is decanted and the lower acid layer is washed three times with 100 milliliter portions of fresh dichloromethane. The dichloromethane decants are combined with the other dichloromethane layer and this total mixture is washed with water containing a few drops of concentrated ammonium hydroxide. The dichloromethane is removed by stripping, leaving a pot residue of 11.5 grams of a white crystalline solid which when analyzed by vapor phase chromatography is found to consist of 60 mole percent 2,3,5,6-tetrachloropyridine, 35 mole percent pentachloropyridine and 5 mole percent 2,3,4,5-tetrachloropyridine. The acid layer is added with agitation to 500 milliliters of cold water and the chloropyridine content separates as a second liquid phase. About 50 milliliters of dichloromethane is added with agitation and the mixture allowed to phase separate. The aqueous acid-containing upper layer is discarded and the lower dichloromethane-containing layer washed with water followed by a wash with water containing a few drops of ammonia. The dichloromethane is removed by stripping leaving a pot residue of 88 grams of a liquid residue (white solid at about 15° C.) which is analyzed by vapor phase chromatography and infrared spectroscopy and is found to consist of 99.5 percent pure 2,3,4,5-tetrachloropyridine.

EXAMPLE 3

A polychloropyridine separation is carried out in a manner substantially as described in Example 2, except that starting mixture consists of 200 grams of a mixed feed containing 3,4,5,6-tetrachloro-2-(trichloromethyl)pyridine (82 weight percent), 3,4,5-trichloro-2-(trichloromethyl)pyridine (16weight percent) and 3,5-dichloro-2-(trichloromethyl)pyridine (2weight percent) dissolved in 100 milliliters of dichloromethane. While this mixture is being agitated, 112 grams of 86 percent sulfuric acid is slowly added. After phase formation and separation, 163.2 grams of 3,4,5,6-tetrachloro-2-(trichloromethyl)pyridine having a purity of 98 percent is recovered from the upper dichloromethane layer and 31.2 grams of a mixture of 3,4,5-trichloro-2-(trichloromethyl)-pyridine and 3,5-dichloro-2-(trichloromethyl)pyridine is recovered from the acid layer. A mechanical loss of 5.6 grams is incurred.

In another run following the above procedure wherein 96 percent sulfuric acid is used, the purity of the 3,4,5,6-tetrachloro-2-(trichloromethyl)pyridine recovered is 99.5 percent.

EXAMPLE 4

A sample of the crude mixed product from a liquid phase chlorination of gamma picoline (as the dihydrochloride) is resolved by vapor phase chromatography into 9 peaks (fractions).

Peaks 1 through 8 constitute 62.4 mole percent of the components of the eluents and peak 9, which was trapped on exiting from the vapor phase chromatographic column, constituted 37.6 percent of the eluents and upon mass spectrographic analysis is found to consist primarily of 2,3,5,6-tetrachloro-4-(trichloromethyl)pyridine with a small amount of 2,3,6-trichloro-4-(trichloromethyl)pyridine. The inability of the latter species, i.e., which has a hydrogen in the beta position to the nitrogen but also has an adjacent trichloromethyl group to form a salt with sulfuric acid, is thus demonstrated.

EXAMPLE 5

A 150 gram sample of the crude polyhalopyridine product mixture from the same source as employed in Example 4 is subjected to an aspiration step to remove any free chlorine present and mixed with 200 milliliters of dichloromethane. The mixture is agitated and to this agitated mixture is added 150 grams of technical grade concentrated sulfuric acid. Agitation is continued for a few minutes, after which the mixture is allowed to separate into distinct phases. The less dense dichloromethane layer is decanted. Two additional 150 gram samples of the crude product are mixed with 200 milliliters of dichloromethane and treated in the same manner with 200 gram and 173 gram samples of fresh acid, respectively. The resulting dichloromethane layers which separate are recovered, combined and mixed with 139 grams of fresh acid. After separation from this last stage, the acid layers are combined and extracted with three 500 milliliter portions of fresh dichloromethane. This latter portion, after separation from the acid layer, is combined with the other dichloromethane extracts. The extract mixtures are contacted with 150 grams of fresh acid, separated and washed with water until the wash water becomes neutral to pH paper. The dichloromethane solvent is removed by stripping, leaving a pot residue which is found to be 157.5 grams of 91 percent pure 2,3,5,6-tetrachloro-2-(trichloromethyl)pyridine.

EXAMPLE 6

A mixture containing 1.8 grams of 2,3,4,5-tetrachloropyridine and 0.2 grams of 2,3,5,6-tetrachloropyridine is mixed in an open reactor with 25 milliliters of hexane and 4 grams of ethanesulfonic acid. A temperature rise of 20° C. is measured. The mixture is allowed to phase separate. A quantitive yield of 2,3,4,5-tetrachloropyridine is recovered from the acid layer and a quantitative yield of 2,3,5,6-tetrachloropyridine is recovered from the hexane layer.

Additional runs are made in the same manner with fresh portions of the same polyhalogenated pyridine mixture employing ethanedisulfonic acid, methanesulfonic acid and methanedisulfonic acid. In each run, separation of 2,3,4,5-tetrachloropyridine and 2,3,5,6-tetrachloropyridine is realized.

EXAMPLE 7

In an additional experiment, separate 10 gram samples of (a) 2,3,4,5-tetrachloropyridine, (b) 2,5-dichloro-pyridine and (c) 3,4,5-trichloro-2-(trichloromethyl)pyridine are each mixed with 2 grams of 98 percent sulfuric acid. Each mixture is separately extracted with a total of 100 milliliters of dichloromethane. After extraction, there remains a very viscous semiliquid. Each of the liquids is weighed in a dry box and analyzed by base titration to determine the sulfuric acid content. These contents as set forth below indicate the formation of the corresponding sulfuric acid salt for each of the pyridines.

| Compound | Pyridine/Acid Mole Ratio of Composition | Acid Content by Weight |
| --- | --- | --- |
| 2,3,4,5-tetrachloropyridine | 1:2 | 46% |
| 2,5-dichloropyridine | 1:2 | 56% |
| 3,4,5-trichloro- 2-(trichloromethyl)pyridine | 1:2 | 46% |

EXAMPLE 8

A series of runs are made following the general procedure and using the same pyridine mixture as in Example 2. The acid employed is 86 percent sulfuric acid and in each run the mole ratio of sulfuric acid to pyridine compound is varied over the range of from 1.3 to 4.4 moles of acid per mole of pyridine. The results of these runs as set forth in the table below show the effect of the mole ratio of acid to the pyridine mixture on the separation and recovery or 2,3,4,5-tetrachloropyridine from the starting mixtures.

| Percent Yield of 2,3,4,5-Tetrachloropyridine | Molar Ratio of 86% Acid to Pyridine Compounds |
| --- | --- |
| 1 | 1.3 |
| 20 | 1.7 |
| 35 | 2.0 |
| 57 | 2.5 |
| 80 | 3.0 |
| 95 | 3.5 |
| 99 | 4.0 |
| 99+ | 4.4 |

In a similar operation using the same pyridine mixture and 96 percent sulfuric acid, it is found that a ratio of 2 to 3 moles of acid per mole of pyridine compound suffices to provide at least about 80 percent separation and recovery of 2,3,4,5-tetrachloropyridine.

In another similar operation, it is found that similar recoveries of 3,4,5-trichloro-2-(trichloromethyl)-pyridine using 86 percent sulfuric acid are realized at acid/pyridine compound mole ratios of from about 5 to about 7.

EXAMPLE 9

A series of runs are made employing portions of the chloropyridine mixture as in Example 2. In each of these runs, 100 grams of the chloropyridine mixture is mixed with 200 milliliters of dichloromethane and to this mixture is added 110 grams of sulfuric acid. In each run, the acid concentration is varied. After acid addition, the mixture is allowed to phase separate. 500 Milliliters of water is added to the acid layer to reconvert the acid salt to the original pyridine which is extracted with fresh dichloromethane. The solvent is stripped from the organic extract and the 2,3,4,5-tetrachloropyridine content of the residue determined. The results of these runs as set forth in the table below show the relationship of the acid concentration of the separation or yield of 2,3,4,5-tetrachloropyridine.

| Percent Yield of 2,3,4,5-Tetrachloropyridine* | Acid Concentration |
| --- | --- |
| 17 | 70 |
| 37 | 75 |
| 69 | 80 |
| 79 | 85 |
| 94 | 90 |
| 99 | 96 |
| 99+ | 98 |

*based on total 2,3,4,5-tetrachloropyridine in starting mixture

The alkanesulfonic acids employed herein either can be obtained from commercial suppliers or can be prepared by following known procedures to oxidize the appropriate lead mercaptide to the corresponding lead sulfonate with nitric acid followed by a conversion to the free acid with dry hydrogen chloride in isopropyl alcohol. The alkane disulfonic acids are also available as commercial items or can be prepared by the known reaction of an appropriate bis-alkyl halide with a concentrated aqueous solution of sodium, potassium or ammonium sulfate, followed by a conversion of the salt to the free acid. These preparations are further described in "Synthetic Organic Chemistry", Wagner et al, (1953) pages 811–820, John Wiley & Sons, Inc. New York.

WHAT IS CLAIMED IS:

1. A method for separating halogen substituted pyridine species containing at least one unhindered hydrogen atom in a position alpha or beta to the ring nitrogen and corresponding to the formula

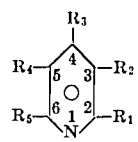

wherein each of $R_1$, $R_2$, $R_3$, $R_4$ and $R_5$ independently represents hydrogen, chloro, fluoro, bromo, iodo, nitro, cyano, trichloromethyl and loweralkyl of one to four carbon atoms, with the proviso that at least one of $R_1$, $R_2$, $R_4$ and $R_5$ must be hydrogen and that at least one of $R_1$, $R_2$, $R_3$, $R_4$ and $R_5$ must be chloro, fluoro, bromo or iodo, from admixture with closely related halogen substituted pyridine species not having an unhindered hydrogen in the said alpha or beta position and corresponding to the formula

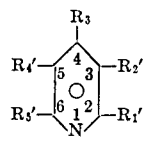

wherein each of $R_1'$, $R_2'$, $R_4'$ and $R_5'$ independently represents chloro, fluoro, bromo, iodo, nitro, cyano, trichloromethyl and loweralkyl of one to four carbon atoms and $R_3$ is as hereinabove set forth, with the proviso that at least one of $R_1'$, $R_2'$, $R_3$, $R_4'$ and $R_5'$ must be chloro, fluoro, bromo or iodo, which comprises, contacting a mixture of the hereinabove set forth halogen substituted pyridine containing species having at least one unhindered hydrogen atom in a position alpha or beta to the ring nitrogen and species not having an unhindered hydrogen in said alpha or beta position, with at least one of concentrated sulfuric acid having an acid strength of from 70 to 98 percent $H_2SO_4$, an alkane sulfonic acid containing from 1 to about 5 carbon atoms or an alkene disulfonic acid containing from one to about five carbon atoms, said acid being present in a molar ratio of from 1 to 7 moles per mole of said halogen substituted pyridines in the presence of an inert liquid carrier, said carrier being a solvent for the halogen substituted pyridines not having an unhindered alpha or beta hydrogen atom and being essentially immiscible with said acid, said contacting is carried out at a temperature of from 0° C. to the temperature at which the acid attacks the halogenated pyridines for a period of time sufficient to complete the reaction and thereafter separating the species not having an unhindered hydrogen atom therefrom.

2. The method according to claim 1 wherein the halogen substituted pyridine containing mixture is mixed with said inert liquid carrier prior to said acid contacting.

3. The method according to claim 1 wherein the halogen substituted pyridine containing mixture is a product from the halogenation of a pyridine.

4. The method according to claim 3 wherein the mixture contains 2,3,4,5-tetrachloropyridine, 2,3,5,6-tetrachloropyridine and pentachloropyridine.

5. The method according to claim 3 wherein the mixture contains 3,4,5,6-tetrachloro-2-(trichloromethyl)-pyridine, 3,4,5-trichloro-2-(trichloromethyl)pyridine and 3,5-dichloro-2-(trichloromethyl)pyridine.

6. The method according to claim 3 wherein the mixture contains 2,3,5,6-tetrachloro-4-(trichloromethyl)-pyridine and 2,3,6-trichloro-4

7. The method according to claim 2 wherein the acid is concentrated sulfuric acid, the liquid carrier is dichloromethane and the halogen substituted pyridine recovered is 2,3,4,5-tetrachloropyridine.

8. The method according to claim 5 wherein the acid has a strength of at least 70 percent up to 98 percent $H_2SO_4$, said acid being present in a molar ratio of from 1 to 7 moles per mole of said halogen substituted pyridines and the liquid carrier is present in the amount of from about 2 to 10 volumes per volume of acid.

9. The method according to claim 6 wherein the acid has a strength of between about 80 to about 96 percent $H_2SO_4$, said acid being in a molar ratio of from 2 to 7 moles per mole of said halogen substituted pyridines and the liquid carrier is present in the amount of from about 2 to 10 volumes per volume of acid.

10. The method according to claim 2 wherein the acid is one of an alkane sulfonic acid or an alkane disulfonic acid, the liquid carrier is hexane and the halogen substituted pyridine recovered is 2,3,4,5-tetrachloropyridine.

* * * * *